(12) United States Patent
Harada et al.

(10) Patent No.: US 9,431,923 B2
(45) Date of Patent: Aug. 30, 2016

(54) POWER CONVERTER

(71) Applicant: DAIKIN INDUSTRIES, LTD., Osaka-shi, Osaka (JP)

(72) Inventors: Yoshiyuki Harada, Shiga (JP); Toshiyuki Maeda, Osaka (JP)

(73) Assignee: DAIKIN INDUSTRIES, LTD., Osaka-Shi (JP)

( * ) Notice: Subject to any disclaimer, the term of this patent is extended or adjusted under 35 U.S.C. 154(b) by 2 days.

(21) Appl. No.: 14/438,778

(22) PCT Filed: Oct. 11, 2013

(86) PCT No.: PCT/JP2013/006108
§ 371 (c)(1),
(2) Date: Apr. 27, 2015

(87) PCT Pub. No.: WO2014/073167
PCT Pub. Date: May 15, 2014

(65) Prior Publication Data
US 2015/0303825 A1    Oct. 22, 2015

(30) Foreign Application Priority Data
Nov. 8, 2012  (JP) .................................. 2012-246719

(51) Int. Cl.
| H02M 1/32 | (2007.01) |
| H02M 7/537 | (2006.01) |
| H02M 7/5387 | (2007.01) |
| H02M 5/458 | (2006.01) |
| H03K 17/082 | (2006.01) |

(52) U.S. Cl.
CPC ............... *H02M 7/537* (2013.01); *H02M 1/32* (2013.01); *H02M 5/4585* (2013.01); *H02M 7/5387* (2013.01); *H02M 2001/327* (2013.01)

(58) Field of Classification Search
CPC .. H02M 1/32; H02M 2001/325; H02M 5/42; H02M 5/453; H02M 7/5387; H03K 17/08; H03K 17/081; H03K 17/08104; H03K 17/0814; H03K 17/08142; H03K 17/082; H03K 17/08222; H02H 9/02
See application file for complete search history.

(56) References Cited

U.S. PATENT DOCUMENTS

| 4,660,137 A * | 4/1987 | Hotaka | H02M 3/3376 361/87 |
| 4,823,251 A * | 4/1989 | Kawabata | H02H 7/1227 363/95 |
| 5,065,304 A * | 11/1991 | Tamai | H02M 7/53875 363/95 |
| 6,163,019 A * | 12/2000 | Green | H02M 7/53873 219/660 |

(Continued)

FOREIGN PATENT DOCUMENTS

| JP | 2006-50886 A | 2/2006 |
| JP | 2006-230079 A | 8/2006 |

(Continued)

*Primary Examiner* — Gary L Laxton
(74) *Attorney, Agent, or Firm* — Birch, Stewart, Kolasch & Birch, LLP

(57) ABSTRACT

An operation area of a motor is increased without increasing the capacity of a switching element. A current limiter which limits a current flowing in switching elements to prevent the current from exceeding a predetermined current limit value is provided. A current limit value controller which decreases the current limit value if a loss generated in the switching elements increases at a same current value, and increases the current limit value if the loss decreases at a same current value, is provided.

20 Claims, 9 Drawing Sheets

(56) References Cited

U.S. PATENT DOCUMENTS

| | | | | |
|---|---|---|---|---|
| 6,924,993 B2 * | 8/2005 | Stancu | ............ | H02M 7/53875 323/908 |
| 8,395,338 B2 * | 3/2013 | Kuroda | ................ | H02P 6/20 318/400.11 |
| 9,000,705 B2 * | 4/2015 | Kaidu | .................. | H02P 6/28 318/400.06 |
| 2006/0007615 A1 | 1/2006 | Ochiai et al. | | |

FOREIGN PATENT DOCUMENTS

| | | |
|---|---|---|
| JP | 2008-109768 A | 5/2008 |
| JP | 2009-38891 A | 2/2009 |
| JP | 2010-166707 A | 7/2010 |
| JP | 2010-220449 A | 9/2010 |
| JP | 2011-67010 A | 3/2011 |
| JP | 2011-120471 A | 6/2011 |

* cited by examiner

POWER CONVERTER

TECHNICAL FIELD

The present invention relates to power converters having a switching element.

BACKGROUND ART

In some power converters (inverter circuits) configured to supply power to e.g., an electric compressor of an air conditioner, a protection mechanism which prevents a current from exceeding its predetermined upper limit (a current limit) is provided in order to protect a switching element (see, for example, Patent Document 1).

CITATION LIST

Patent Document

Patent Document 1: Japanese Unexamined Patent Publication No. 2011-120471

SUMMARY OF THE INVENTION

Technical Problem

In order to increase the operation area of the electric compressor, the current limit of the switching element needs to be increased. In many cases, the current limit is determined in consideration of operational conditions where the loss of the switching element is the maximum. Thus, in order to increase the current limit, it is necessary to increase the capacity of the switching element and increase the size of a cooler (e.g., a heat sink) attached to the switching element.

However, increasing the capacity of the switching element or increasing the size of the cooler result in an increase in cost and size of the power converter, and that is not preferable.

The present invention was made in view of the above problem, and it is an object of the invention to increase the operation area without increasing the capacity of the switching element.

Solution to the Problem

The first aspect of the present invention is directed to a power converter, including: an inverter circuit (4) having a plurality of switching elements (Su, Sv, Sw, Sx, Sy, Sz); a switching controller (9) which controls switching of the switching elements (Su, Sv, Sw, Sx, Sy, Sz); and a current limiter (10) which limits a current flowing in the switching elements (Su, Sv, Sw, Sx, Sy, Sz) to prevent the current from exceeding a predetermined current limit value (Imax), wherein the power converter includes a current limit value controller (8) which decreases the current limit value (Imax) if a loss generated in the switching elements (Su, Sv, Sw, Sx, Sy, Sz) increases at a same current value, and increases the current limit value (Imax) if the loss decreases at a same current value.

In this configuration, the current limit value (Imax) is decreased if the loss generated in the switching elements (Su, Sv, Sw, Sx, Sy, Sz) increases at a same current value, and the current limit value (Imax) is increased if the loss decreases at a same current value. Thus, a larger current can be applied to a load (e.g., a motor) in a region where the current limit value (Imax) is increased.

The second aspect of the present invention is that in the power converter of the first aspect of the present invention, the switching controller (9) controls the switching by appropriately switching among multiple types of switching control modes in which the loss at the same current value differs from one another, and the current limit value controller (8) changes the current limit value (Imax) according to the switching among the switching control modes.

In this configuration, in which the loss at the same current value changes depending on the switching control modes, a larger current can be applied to the load in a mode where the loss is smaller.

The third aspect of the present invention is that in the power converter of the second aspect of the present invention, the switching control modes include a mode performing overmodulation control, and in the mode performing overmodulation control, the current limit value controller (8) sets the current limit value (Imax) to be greater than the current limit value (Imax) in the other switching control modes.

In this configuration, the current limit value (Imax) is increased in the overmodulation control mode, and therefore, a larger current can be applied to the load.

The fourth aspect of the present invention is that in the second or third aspect of the present invention, the inverter circuit (4) is configured to be able to output a three-phase alternating current, the switching control modes include a three-phase modulation mode in which three phases output from the inverter circuit (4) are modulated, and a two-phase modulation mode in which only two of the three phases output from the inverter circuit (4) are modulated, and in the two-phase modulation mode, the current limit value controller (8) sets the current limit value (Imax) to be greater than the current limit value (Imax) in the three-phase modulation mode.

In this configuration, the current limit value (Imax) is increased in the two-phase modulation mode, and therefore, a higher current can be applied to the load.

The fifth aspect of the present invention is that in any one of the first to fourth aspects of the present invention, the switching controller (9) controls the switching by appropriately changing a carrier frequency (fc), and the current limit value controller (8) increases the current limit value (Imax) such that the lower the carrier frequency (fc) is, the greater the current limit value (Imax) becomes.

In this configuration, the current limit value (Imax) is increased if the carrier frequency (fc) decreases, and therefore, a larger current can be applied to the load.

The sixth aspect of the present invention is that in any one of the first to fifth aspects of the present invention, the current limit value controller (8) sets the current limit value (Imax) such that the lower an input voltage to the inverter circuit (4) is, the greater the current limit value (Imax) becomes.

In this configuration, the current limit value (Imax) is increased if the input voltage to the inverter circuit (4) decreases, and therefore, a larger current can be applied to the load.

Advantages of the Invention

According to the first aspect of the present invention, the operation area (i.e., the magnitude of torque that can be output) of the motor can be increased without increasing the capacity of the switching elements. In other words, desired torque can be achieved even by a switching element with smaller capacity, which means that the power converter is reduced in size.

According to each of the second to fifth aspects of the present invention, the current limit value is changed according to changes in switching control mode. This allows easy control of the current limit value.

According to the sixth aspect of the present invention, if, for example, variations in voltage input to an inverter circuit occur in a commercial power supply, a current is supplied to a load in accordance with the variations.

DESCRIPTION OF EMBODIMENTS

Embodiments of the present invention will be described below with reference to the drawings. The following embodiments are merely preferred examples in nature, and are not intended to limit the scope, applications, and use of the invention.

First Embodiment of the Invention

Figure 1:
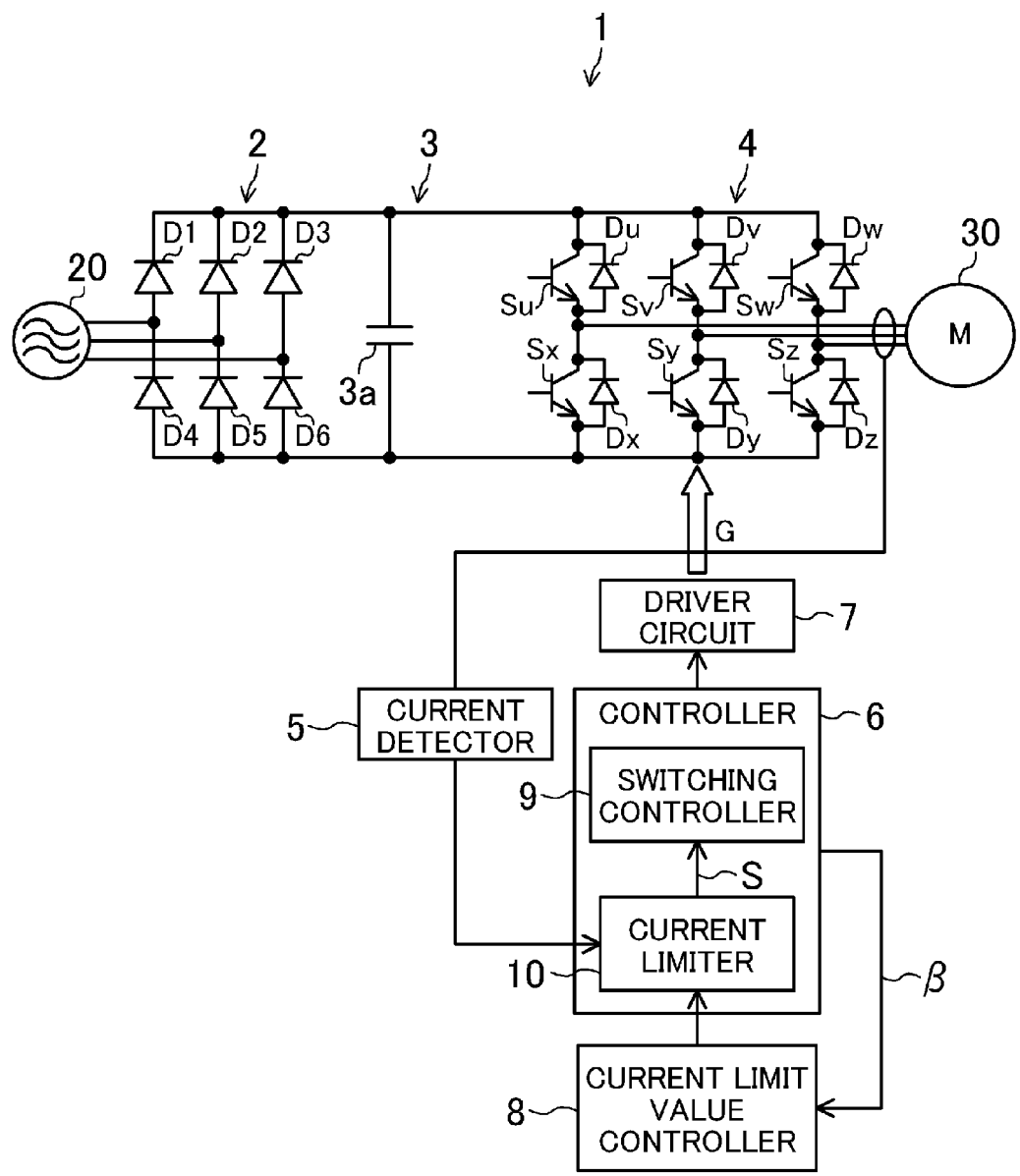
FIG. 1 illustrates an example configuration of a power converter according to the first embodiment of the present invention.

FIG. 1 illustrates an example configuration of a power converter (1) according to the first embodiment of the present invention. The power converter (1) converts an alternating input voltage (in this example, a power supply voltage from a three-phase alternating-current power supply (20)) into a predetermined alternating output voltage (in this example, a three-phase alternating voltage) and supplies it to a motor (30). In this example, the motor (30) is, for example, a DC brushless motor, which is used to drive a compressor provided in a refrigerant circuit of an air conditioner.

<General Configuration>

The power converter (1) has a converter circuit (2), a direct current link (3), an inverter circuit (4), a current detector (5), a controller (6), a driver circuit (7), and a current limit value controller (8).

<Configuration of Converter Circuit>

The converter circuit (2) is connected to the alternating-current power supply (20), and provides full-wave rectification of an input from the alternating-current power supply (20). In this example, the converter circuit (2) has six diodes (D1, D2, D3, D4, D5, D6) connected together in a bridge configuration.

<Configuration of Direct Current Link>

The direct current link (3) has a capacitor (3a) connected in parallel to an output node of the converter circuit (2), and receives an output of the converter circuit (2) and generates a direct current link voltage (Vdc). Note that a capacitor does not necessarily have to be connected to the direct current link (3).

<Configuration of Inverter Circuit>

An input node of the inverter circuit (4) is connected in parallel to the capacitor (3a). The inverter circuit (4) converts the direct current link voltage (Vdc) from the direct current link (3) to an alternating output voltage (in this example, a three-phase alternating voltage) by switching operations, and supplies it to the motor (30). In the present description, a voltage applied to the input node of the inverter circuit (4) is referred to as an input voltage.

In this example, the inverter circuit (4) has six switching elements (Su, Sv, Sw, Sx, Sy, Sz) and six freewheeling diodes (Du, Dv, Dw, Dx, Dy, Dz) to supply the three-phase alternating voltage to the motor (30). More specifically, the inverter circuit (4) has three switching legs each comprised of two switching elements connected in series. In the three switching legs, midpoints between the upper-arm switching elements (Su, Sv, Sw) and the lower-arm switching elements (Sx, Sy, Sz) are connected to coils of respective phases (i.e., u-phase, v-phase, and w-phase coils) of the motor (30). Further, the freewheeling diodes (Du, Dv, Dw, Dx, Dy, Dz) are respectively connected to the switching elements (Su, Sv, Sw, Sx, Sy, Sz) in anti-parallel.

<Configuration of Current Detector>

The current detector (5) is comprised, for example, of a current transformer or a so-called shunt resistor, and detects a phase current. A value detected by the current detector (5) is input to the controller (6).

<Configurations of Controller and Driver Circuit>

An output (G) of the driver circuit (7) is input to control terminals (gates) of the switching elements (Su, Sv, Sw, Sx, Sy, Sz) of the inverter circuit (4). The on/off operations are controlled by the output (G). The output (G) of the driver circuit (7) is controlled by the controller (6).

The controller (6) is comprised, for example, of a microcomputer and a program that operates the microcomputer. The controller (6) includes a switching controller (9) and a current limiter (10).

—Switching Controller—

The switching controller (9) controls switching of the switching elements (Su, Sv, Sw, Sx, Sy, Sz) via the driver circuit (7). In the switching control, the upper-arm switching element (Su, Sv, Sw) and the lower-arm switching element (Sx, Sy, Sz) are complementarily switched in each of the switching legs. That is, in each of the switching legs, the lower-arm switching element (Sx, Sy, Sz) is off when the upper-arm switching element (Su, Sv, Sw) is on, and the upper-arm switching element (Su, Sv, Sw) is off when the lower-arm switching element (Sx, Sy, Sz) is on.

The switching controller (9) controls the above switching by appropriately switching between multiple types of switching control modes. In the present embodiment, the switching controller (9) appropriately switches between two switching control modes, depending on the operational state (specifically, the rotational speed) of the motor (30). In this example, one of the switching control modes is a so-called two-phase modulation mode. The other switching control mode is a so-called overmodulation control mode. FIG. 2(A) shows changes in switching waveform (specifically, a phase voltage) with time in the two-phase modulation mode. FIG. 2(B) shows changes in switching waveform with time in the overmodulation control mode.

—Two-Phase Modulation Mode—

Figure 2:
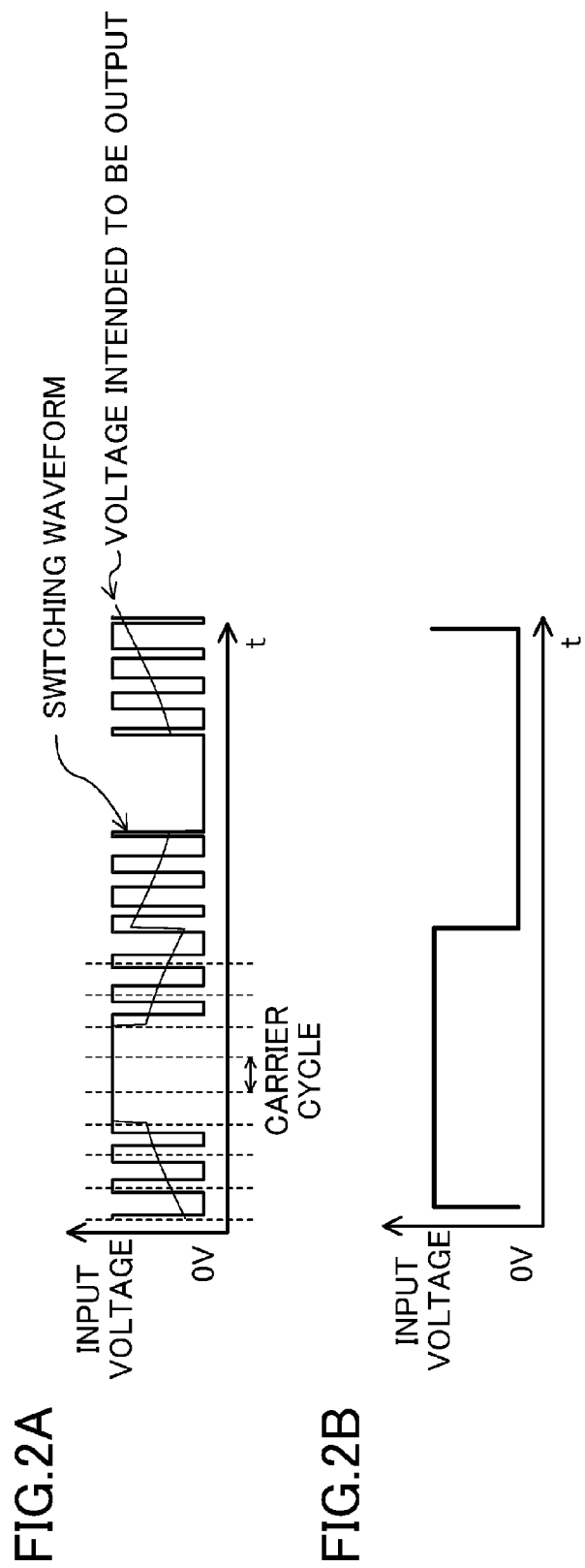
FIG. 2(A) shows changes in switching waveform (specifically, a phase voltage) with time in a two-phase modulation mode.
FIG. 2(B) shows changes in switching waveform with time in an overmodulation control mode.

The two-phase modulation mode is a control mode in which two of three phases are switched on/off, and the remaining one phase is fixed to the on or off state for a predetermined period of time. In the two-phase modulation mode, the switching is performed so that the average voltage in a carrier cycle will be a voltage intended to be output. The two-phase modulation mode is a modulation scheme in which an interphase voltage is controlled to a sine wave by fixing the switching of one phase (to a voltage input to the inverter circuit (4) or 0 V) and switching the other two phases on/off for a predetermined period. In general, the motor (30) is controlled at the interphase voltage. The two-phase modulation mode shown in FIG. 2 is an example scheme in which the output is fixed to the input voltage in the 60-degree period of the sine wave peak portion, and to 0 V in the 60-degree period of the sine wave bottom portion. When the shown phase is being switched on/off, one of the other two phases is fixed.

—Overmodulation Control Mode—

In the overmodulation control mode, the output of the inverter circuit (4) is controlled to avoid patterns (so-called null vectors) where all the phases are on or all the phases are off, throughout one cycle of the carrier signal. The switching waveform in the overmodulation control mode shown in FIG. 2 is the largest rectangular waveform that can be output in the overmodulation. Comparison between the switching waveform in the two-phase modulation mode and the switching waveform in the overmodulation control mode shows that the switching occurs less frequently in the overmodulation control mode than in the two-phase modulation mode.

—Switching Between Control Modes—

In the present embodiment, the switching control modes are switched depending on the rotational speed of the motor (30). Specifically, the two-phase modulation mode is selected in a region where the rotational speed is lower than a predetermined rotational speed, and the overmodulation control mode is selected in a region where the rotational speed is higher than the predetermined rotational speed. Note that in this description the two-phase modulation mode and the overmodulation control mode are switched with the assumption that the current conditions are the same, and for the reason that the increase and decrease of the output voltage of the inverter circuit (4) depend on the rotational speed. The overmodulation control mode enables the amplitude of a first harmonic (also called a fundamental component) of the output of the inverter circuit (4) to be higher than the highest amplitude of the sine wave that can be produced by the direct current link voltage (Vdc). That is, the overmodulation control mode is a control method that is effective when a higher rotational speed is necessary.

However, the output of the inverter circuit (4) has a limit, and the rotational speed that can be increased in the overmodulation control mode accordingly has an upper limit. Thus, in the present embodiment, a current phase is controlled in order to make the rotational speed higher than the upper limit. That is, in the present embodiment, a current phase (β) is controlled to a constant value (e.g., 20°) until the rotational speed reaches the upper limit. In the subsequent rotational speed region, the switching is controlled such that the current phase leads, in order to cancel out a magnetic flux of the motor (30). That is, the switching controller (9) performs so-called flux weakening control.

—Current Limiter—

The current limiter (10) is configured to output a predetermined instruction (S) to the switching controller (9) when a phase current exceeds a given threshold (hereinafter referred to as a current limit value (Imax)). The current limit value (Imax) can be set and renewed from outside the current limiter (10). In the present embodiment, the current limit value controller (8) which will be described later sets the current limit value (Imax) in the current limiter (10).

When the instruction (S) is input to the switching controller (9) from the current limiter (10), the switching controller (9) controls switching of the switching elements (Su, Sv, Sw, Sx, Sy, Sz) to decrease the rotational speed of the motor (30). More specifically, the switching is controlled such that the frequency of alternating current that is input to the motor (30) is reduced. This reduces a value of current flowing in the inverter circuit (4). If the current value does not decrease even after the decrease in rotational speed of the motor (30), all of the switching elements (Su, Sv, Sw, Sx, Sy, Sz) may be turned off at the time when the rotational speed reaches a set lower limit of the rotational speed to protect the switching elements.

<Configuration of Current Limit Value Controller>

The current limit value controller (8) is comprised of a microcomputer and a program that operates the microcomputer. The current limit value controller (8) and the controller (6) may share the same microcomputer, or different microcomputers may be provided for the current limit value controller (8) and the controller (6).

The current limit value controller (8) is configured to decrease the current limit value if a loss (in other words, heat generation) generated in the switching elements (Su, Sv, Sw, Sx, Sy, Sz) increases at the same current value, and increase the current limit value if the loss decreases at the same current value.

Figure 3:
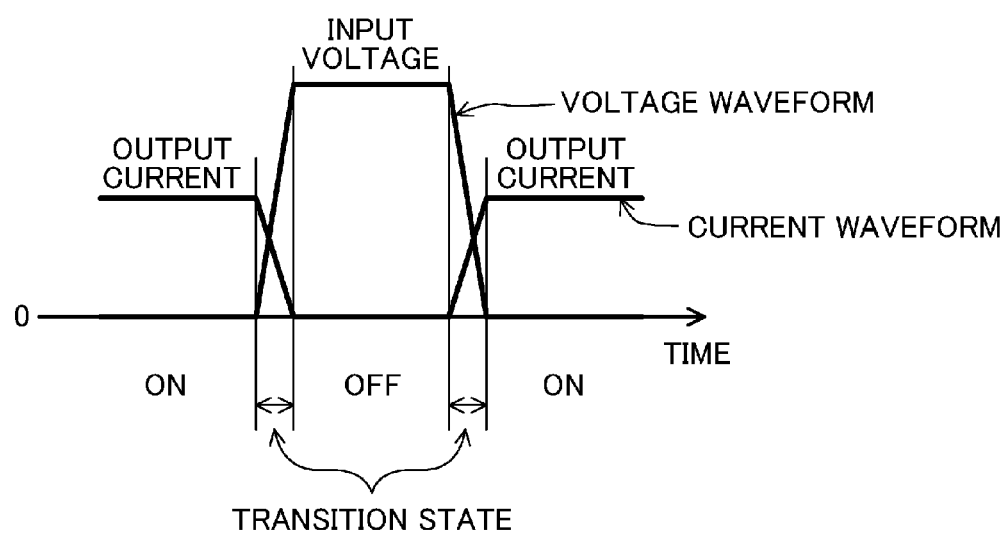
FIG. 3 shows example changes in current and voltage waveform of a switching element with time.

Now, the loss of the switching elements will be explained. FIG. 3 shows example changes in current and voltage waveform of the switching elements with time. The voltage applied to each switching element is 0 V when it is turned on, and is an input voltage when it is turned off. The current flowing in the switching element is an output current when it is turned on, and is 0 A when it is turned off. A loss is generated by the current flowing in the on-state and a resistance of the switching element, and this loss is a conduction loss. The larger the output current is, the greater the conduction loss becomes, and the input voltage is not related. The voltage and the current alternate when the state of the switching element is changed from on to off and off to on, and the loss generated at that moment is the switching loss. The larger the output current is, and the larger the input voltage is, the greater the switching loss becomes.

In the present embodiment, as will be described later, the loss generated at the same current differs depending on the switching control modes. Thus, in the present embodiment, the current limit value controller (8) changes the current limit value (Imax) depending on switching between the switching control modes.

Figure 4:
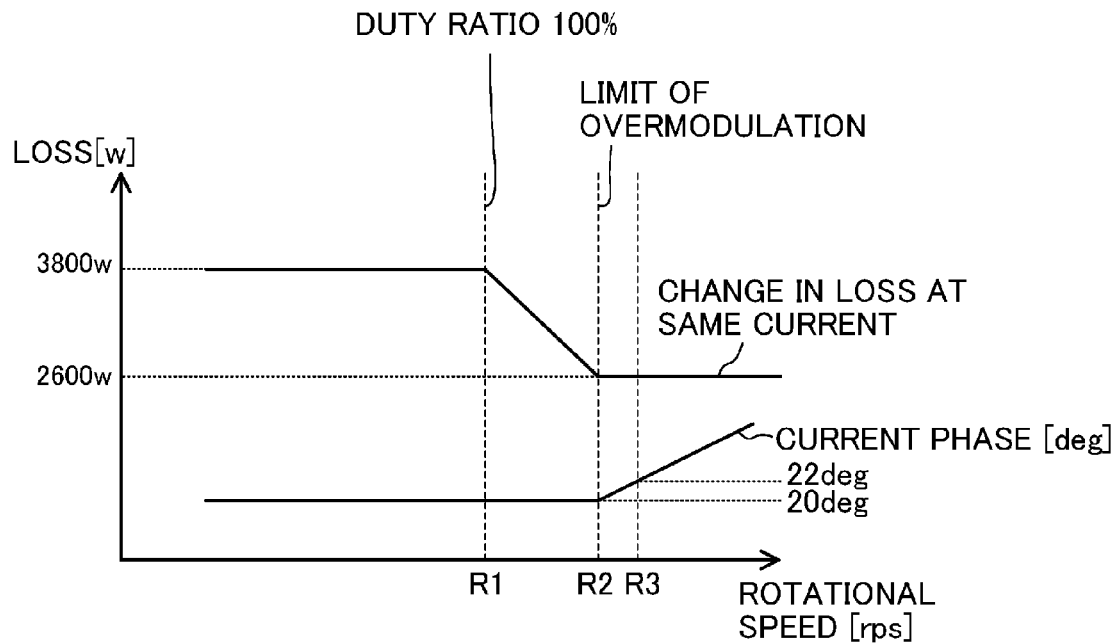
FIG. 4 shows a relationship between a rotational speed and a loss generated in a switching element, and a relationship between the rotational speed and a current phase.

FIG. 4 shows a relationship between the rotational speed and the loss generated in the switching element (Su, Sv, Sw, Sx, Sy, Sz), and a relationship between the rotational speed and the current phase (β). The loss shown in FIG. 4 is a loss generated when the current is constant. In this example, the switching controller (9) selects the two-phase modulation mode when the rotational speed is lower than or equal to R1, and selects the overmodulation control mode when the rotational speed is higher than R1. In a region where the rotational speed is higher than or equal to R2, the switching controller (9) causes the current phase (β) to lead to perform flux weakening control. Note that R3 in FIG. 4 is the rotational speed when the current phase (β) leads by 2°.

In the example in FIG. 4, the loss was 3800 W in the region where the rotational speed is lower than or equal to R1. However, the loss gradually decreases as the rotational speed exceeds R1 and the overmodulation control mode is selected, and decreases to a minimum loss (2600 W in this example) in the overmodulation control mode when the rotational speed is R2. This is because the switching occurs less frequently in the overmodulation control mode than in the two-phase modulation mode, as can be seen from the comparison between the switching waveforms in the overmodulation control mode and the switching waveforms in the two-phase modulation mode (see FIG. 2). That is, the switching loss can be reduced in the overmodulation control mode by the reduced frequency of switching. If the loss in the switching element (Su, Sv, Sw, Sx, Sy, Sz) is reduced, the heat generation of the switching element (Su, Sv, Sw, Sx, Sy, Sz) can be reduced to or below a certain level even when the current limit value (Imax) is increased in accordance with the decrease in the loss. Thus, the switching element (Su, Sv, Sw, Sx, Sy, Sz) can operate without breaking down.

Therefore, when the switching control mode is switched to the overmodulation control mode, the current limit value controller (8) of the present embodiment increases the current limit value (Imax) above the current limit value (Imax) in the other switching control mode (the two-phase modulation mode in this example).

The current limit value controller (8) utilizes information on the current phase (β) to determine which switching control mode the present switching control mode is. Thus, the information on the current phase (β) is input to the current limit value controller (8) from the controller (6). As mentioned earlier, after a while after the switching control mode is switched to the overmodulation control mode, the switching controller (9) causes the current phase (β) to lead. That is, whether the switching control mode is switched to the overmodulation control mode or not can be known by monitoring the information on the current phase (β). Moreover, it is possible to guarantee that the loss has been reliably reduced by determining whether the switching control mode is switched to the overmodulation control mode or not based on the information on the current phase (β).

<Operation of Control on Current Limit Value>

Figure 5:
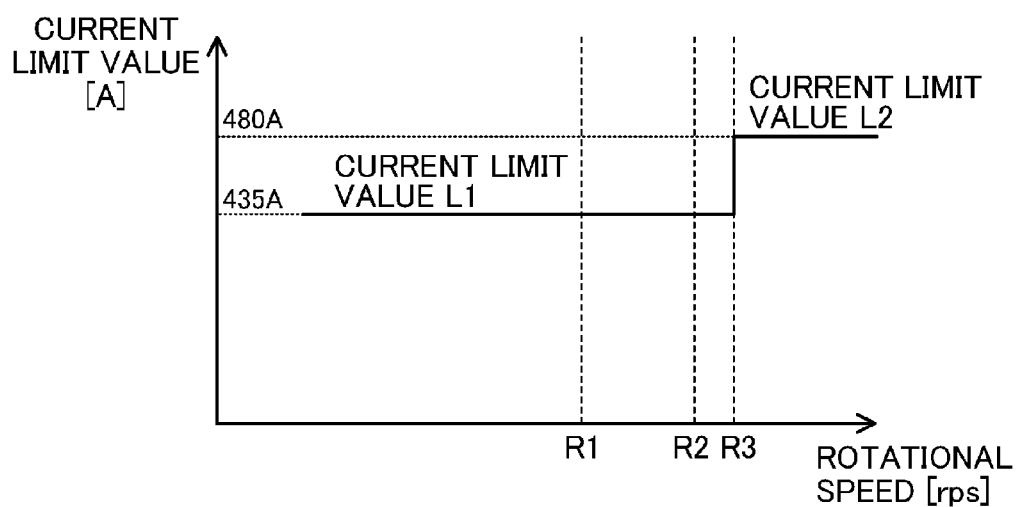
FIG. 5 shows a relationship between a rotational speed of a motor and a current limit value.

FIG. 5 shows a relationship between the rotational speed of the motor (30) and the current limit value (Imax). The rotational speeds R1, R2, and R3 in FIG. 5 are the same as those in FIG. 4. That is, R1 is the speed at which the control mode is switched from the two-phase modulation mode to the overmodulation control mode, and R2 is the rotational speed at which control over the current phase (β) starts to cause the current phase (β) to lead.

In this example, the current limit value controller (8) sets the current limit value (Imax) to a first current limit (L1) in the two-phase modulation mode (rotational speed≤R1) (see FIG. 5). The first current limit (L1) is a value (that is 435 A in this example) determined based on the loss (that is 3800 W in the example in FIG. 4) in the two-phase modulation mode.

As mentioned earlier, the current limit value controller (8) utilizes the information on the current phase (β) to determine whether the present control mode is the overmodulation mode or not. In this example, even after the switching control mode is switched to the overmodulation control mode, the current phase (β) remains 20° until the rotational speed reaches the maximum rotational speed at which the motor is operable in the overmodulation control mode. Thus, the current limit value controller (8) determines that the switching control mode has been switched to the overmodulation control mode, when the current phase (β) exceeds 20° to some or more extent. In the present embodiment, the current limit value controller (8) determines that the present control mode is the overmodulation mode, based on the fact that the current phase (β) is caused to lead by 2° and becomes 22°. Of course, the 20° and 2° are example values, and other values are applicable.

Once the current limit value controller (8) determines that the control mode has been switched to the overmodulation mode, the current limit value controller (8) sets the current limit value (Imax) to a second current limit (L2) (see FIG. 5). The second current limit (L2) is a value greater than the first current limit (L1), and a value (that is 480 A in this example) determined based on the loss (that is 2600 W in the example FIG. 4) in the region where the rotational speed is higher than or equal to R2.

Figure 6:
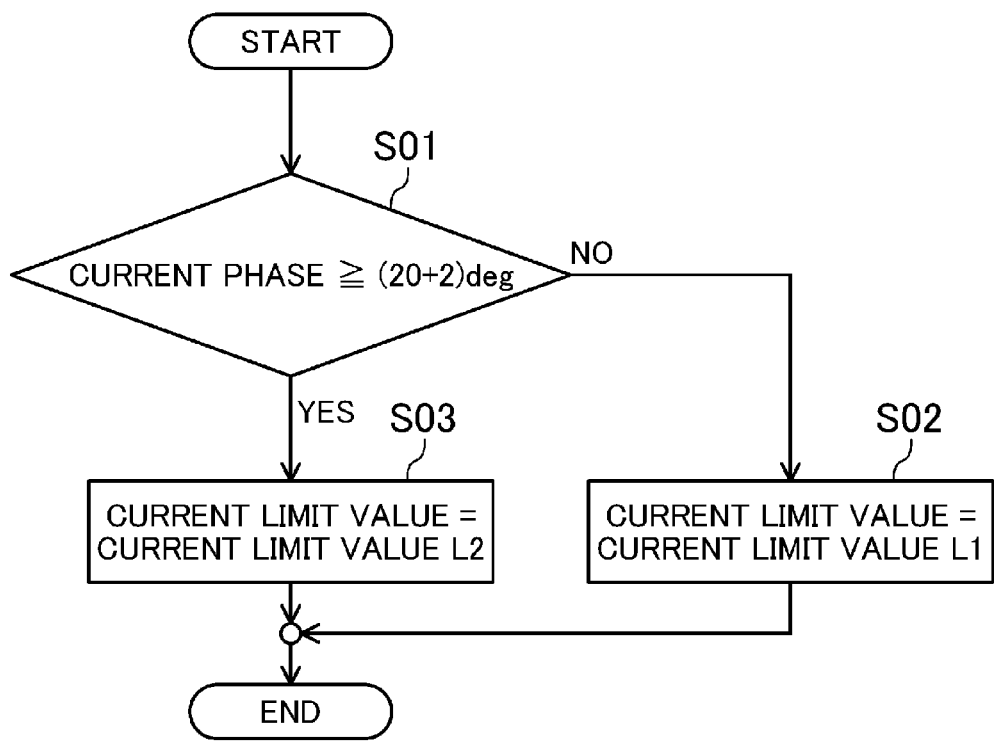
FIG. 6 is a flowchart illustrating control over a current limit value by a current limit value controller.

FIG. 6 is a flowchart illustrating control over the current limit value (Imax) by the current limit value controller (8). The current limit value controller (8) performs the flow, for example, periodically, to renew the current limit value (Imax). When the current limit value controller (8) starts to perform this flow, the current limit value controller (8) determines whether the current phase (β) exceeds a predetermined value or not, specifically whether the current phase (β) exceeds 22° or not. If the current phase (β) does not exceed 22°, the current limit value controller (8) moves to processing in step (S02). In step (S02), the current limit value (Imax) is set to the first current limit (L1). On the other hand, if the current phase (β) is determined to exceed 22° in step (S01), the current limit value controller (8) moves to processing in step (S03). In step (S03), the current limit value (Imax) is set to the second current limit (L2). Since the second current limit (L2) is higher than the first current limit (L1), a larger current can flow in the inverter circuit (4) in the region where the rotational speed exceeds R3.

Advantages of the Present Embodiment

Figure 7:
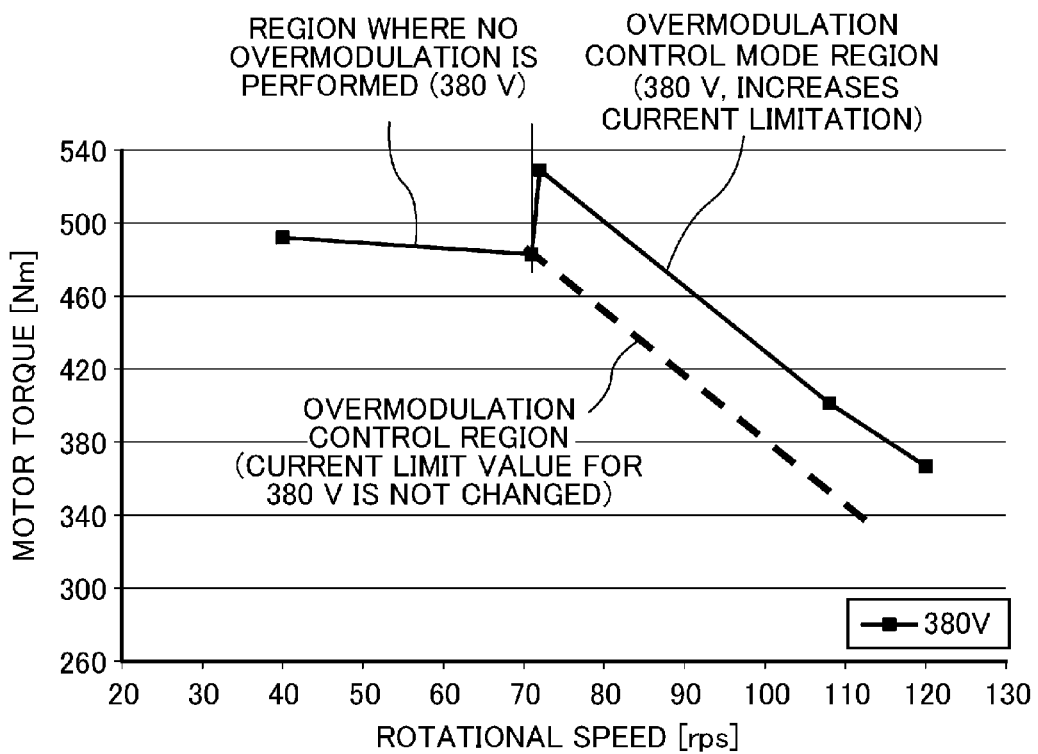
FIG. 7 shows a relationship between a rotational speed and torque of a motor.

FIG. 7 shows a relationship between the rotational speed and the torque of the motor (30). The solid line in FIG. 7 exemplifies the torque of the motor when control over the current limit value according to the present invention is performed. The broken line in FIG. 7 exemplifies the torque of the motor when the current limit value is constant (referred to as a conventional case for sake of simplicity of explanation). In the conventional case, the current cannot be increased since the current limit value is constant. On the other hand, in the power converter (1) of the present embodiment, the current limit value (Imax) is changed from the first current limit (L1) to the second current limit (L2) around when the rotational speed of the motor (30) exceeds 70 rps in the example shown in FIG. 7. As a result, the current in the inverter circuit (4) can be increased in the present embodiment, and the torque of the motor is also increased.

As described above, according to the present embodiment, the operation area (i.e., the magnitude of the torque that can be output) can be increased without increasing the capacity of the switching element. In other words, desired torque can be achieved even by a switching element with smaller capacity, which means that the power converter can be reduced in size.

Modification of the First Embodiment

Whether the control mode has been switched to the overmodulation control mode or not (whether the loss has been reduced or not) may be determined using a duty ratio in the switching control.

After the duty ratio reaches and exceeds 100%, the current limit value (Imax) may be gradually increased in accordance with the decrease in loss at the same current value (see the regions of the rotational speeds R1 to R2 in FIG. 4).

Second Embodiment of the Invention

A power converter (1) of the second embodiment of the present invention controls switching in the two-phase modulation mode, the overmodulation control mode, and a so-called three-phase modulation mode, as well. The power converter (1) changes the current limit value (Imax) depending on switching among these switching control modes. In the three-phase modulation mode, the respective three-phase switching elements (Su, Sv, Sw, Sx, Sy, Sz) are turned on and off so that the average voltage in a carrier cycle will be a voltage intended to be output. The three-phase modulation mode is a modulation scheme in which an interphase voltage is controlled to a sine wave by switching of three phases.

Since these three types of switching control are performed, configurations of the switching controller (9) and the current limit value controller (8) differ from those in the first embodiment. The switching controller (9) of the present embodiment appropriately switches among the two-phase modulation mode, the three-phase modulation mode, and the overmodulation control mode depending on the operational state of the motor (30).

Characteristics of the two-phase modulation mode include that the loss of the switching elements is small because there is a carrier cycle where switching is not performed, that controllability may become worse in a region where an output voltage is low, and that ripple current is large. Thus, the inferior controllability and the large ripple current may affect adversely in some operational states.

Figure 8:
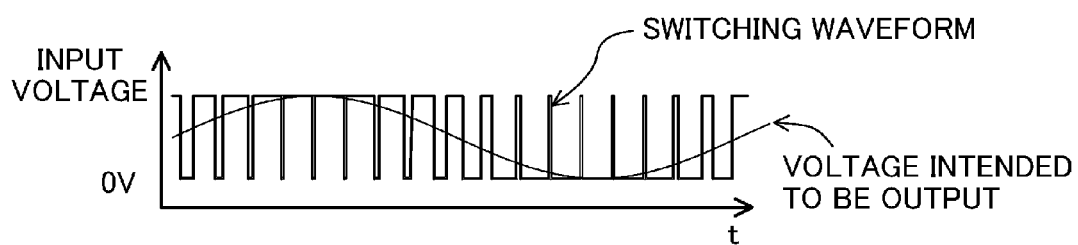
FIG. 8 shows example switching waveforms in a three-phase modulation mode.

FIG. 8 shows example switching waveforms in the three-phase modulation mode. Unlike the two-phase modulation mode, the phase voltage has a sine wave, but switching needs to be performed in all of the carrier cycles. Characteristics of the three-phase modulation mode include that the loss of the switching elements is large because switching is performed 3/2 times as frequently as it is performed in the two-phase modulation mode, that controllability over the waveform is good, and that a ripple current is small.

The two-phase modulation mode and the three-phase modulation mode have the characteristics described above. Thus, the switching controller (9) of the present embodiment switches among the modulation schemes, while taking advantage of the respective characteristics, i.e., improved energy consumption and good controllability. In the present embodiment, the overmodulation control mode is selected in the case where the rotational speed of the motor (30) is controlled to a value greater than or equal to a predetermined value. Note that the two-phase modulation mode, the three-phase modulation mode, and the overmodulation control mode are switched depending on the rotational speed with the assumption that the current conditions are the same, and for the reason that the increase and decrease of the output voltage of the inverter circuit (4) depend on the rotational speed.

In the present embodiment, too, the current limit value controller (8) changes the current limit value (Imax) depending on switching among the switching control modes. For example, fixing the current limit value (Imax) means setting the current limit value (Imax) to a value required under conditions in which the loss is the greatest (in this case, to a current limit value determined from the loss in the three-phase modulation mode), and this produces a loss. The current limit value controller (8) therefore sets the current limit value (L1) in the two-phase modulation mode where the switching loss is smaller, to be greater than the current limit value (L3) in the three-phase modulation mode. Further, the current limit value (L2) in the overmodulation control mode is set to be greater than the current limit value (L1) in the two-phase modulation mode. As a result, the maximum operation area can be ensured in the respective switching control modes.

Figure 9:
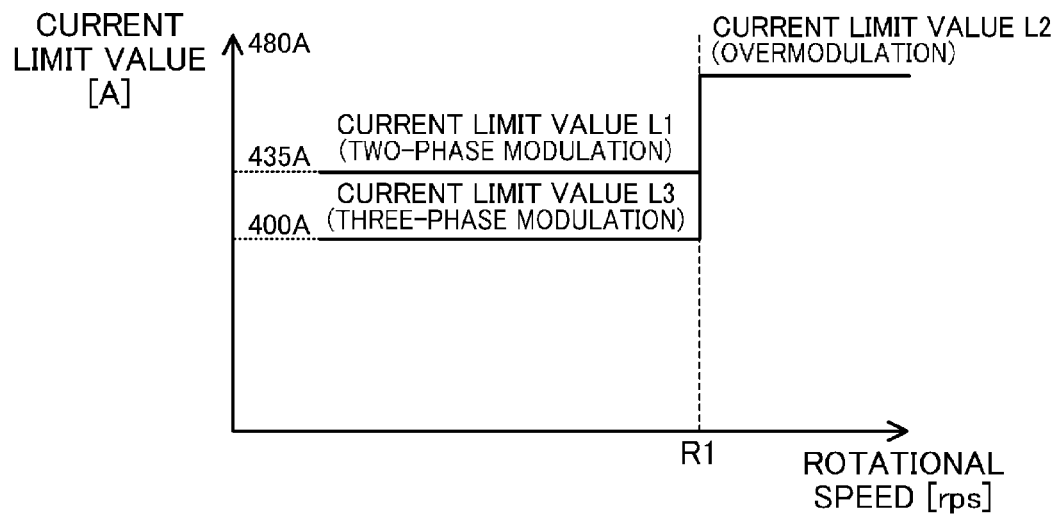
FIG. 9 shows a relationship between a rotational speed and a current limit value of a power converter according to the second embodiment.

FIG. 9 shows a relationship between the rotational speed and the current limit value (Imax) of the power converter (1) of the second embodiment. In this example, in the region where the rotational speed is lower than or equal to RE the modulation schemes are changed, while taking advantage of the characteristics of the respective schemes, i.e., improved energy consumption and reliable controllability. In changing the modulation schemes, the current limit value (Imax) is changed depending on the modulation scheme (i.e., depending on the loss).

Thus, in the present embodiment, too, the current limit value (Imax) is decreased if the loss generated in the switching element (Su, Sv, Sw, Sx, Sy, Sz) increases at the same current value, and the current limit value (Imax) is increased if the loss decreases at the same current value. For this reason, in the present embodiment, too, the operation area (i.e., the magnitude of the torque that can be output) can be increased without increasing the capacity of the switching element.

Third Embodiment of the Invention

A power converter (1) of the third embodiment of the present invention controls switching in the two-phase modulation mode and the overmodulation control mode, and the power converter (1) changes the current limit value (Imax) depending on switching between these switching control modes. Further, the power converter (1) of the present embodiment appropriately changes a carrier frequency. Specifically, either 3 KHz or 6 kHz is selected in controlling the carrier frequency.

The loss at the time when the switching element (Su, Sv, Sw, Sx, Sy, Sz) is on can be expressed by $1/6 EI\Delta Ton/T$, and the loss at the time when the switching element (Su, Sv, Sw, Sx, Sy, Sz) is off can be expressed by $1/6 EI\Delta Toff/T$, wherein E is an input voltage, I is an output current, $\Delta Ton$ is time in which the switching element is turned on, $\Delta Toff$ is time in which the switching element is turned off, and T is a carrier cycle.

It is understood from these formulas that if the conditions other than the carrier frequency (fc) are the same, the switching loss increases in proportion to the carrier frequency (fc). That is, if it is possible to decrease the carrier frequency (fc), the loss of the switching element (Su, Sv, Sw, Sx, Sy, Sz) at the same current value can be reduced, and the current limit value (Imax) can be accordingly increased.

If the carrier frequency (fc) is reduced to half, the switching loss is reduced to half. At this moment, the current limit value controller (8) of the present embodiment changes the current limit value (Imax) depending on the carrier frequency (fc). More specifically, the current limit value controller (8) increases the current limit value (Imax) such that the current limit value (Imax) is set greater when the carrier frequency (fc) in the selected mode is lower. As a result, the maximum operation area can be ensured in the respective switching control modes.

Figure 10:
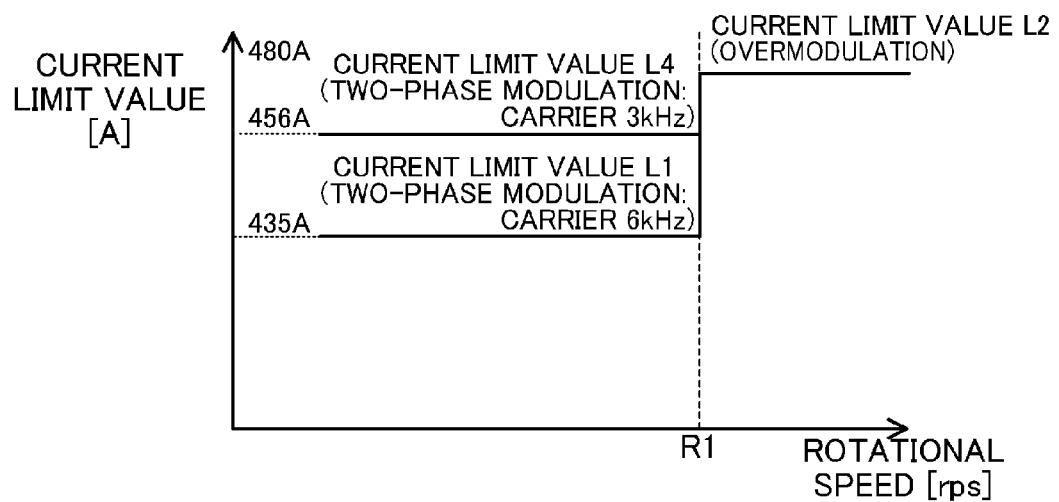
FIG. 10 shows a relationship between a rotational speed and a current limit value of a power converter according to the third embodiment.

FIG. 10 shows a relationship between the rotational speed and the current limit value (Imax) of the power converter (1) of the third embodiment. In this example, the carrier frequency (fc) is changed depending on the operational state. At this moment, the current limit value controller (8) changes the current limit value (Imax) depending on the carrier frequency (fc) (that is, depending on the loss). It is thus possible to increase the current limit value (Imax) in accordance with the decrease in loss. In the example shown in FIG. 10, the current limit value (L4) at the carrier frequency (fc) of 3 kHz is greater than the current limit value (L1) at the carrier frequency (fc) of 6 kHz. Further, the current limit value (L2) in the overmodulation control mode is greater than the current limit value (L4) at the carrier frequency (fc) of 3 kHz. The current limit value (L2) in the overmodulation control mode is set to a value determined based on the loss determined from the waveform in FIG. 2(B). Since the difference in switching loss due to the carrier frequency does not occur, the difference in current limit value due to the difference in carrier frequency does not occur in the overmodulation control mode.

As described above, in the present embodiment, too, the current limit value (Imax) is decreased if the loss generated in the switching element (Su, Sv, Sw, Sx, Sy, Sz) increases at the same current value, and the current limit value (Imax) is increased if the loss decreases at the same current value. For this reason, in the present embodiment, too, the operation area (i.e., the magnitude of the torque that can be output) can be increased without increasing the capacity of the switching element.

The values (3 KHz and 6 kHz) of the carrier frequency (fc) are example values. The carrier frequency (fc) may be selected from three or more values.

Fourth Embodiment of the Invention

Figure 11:
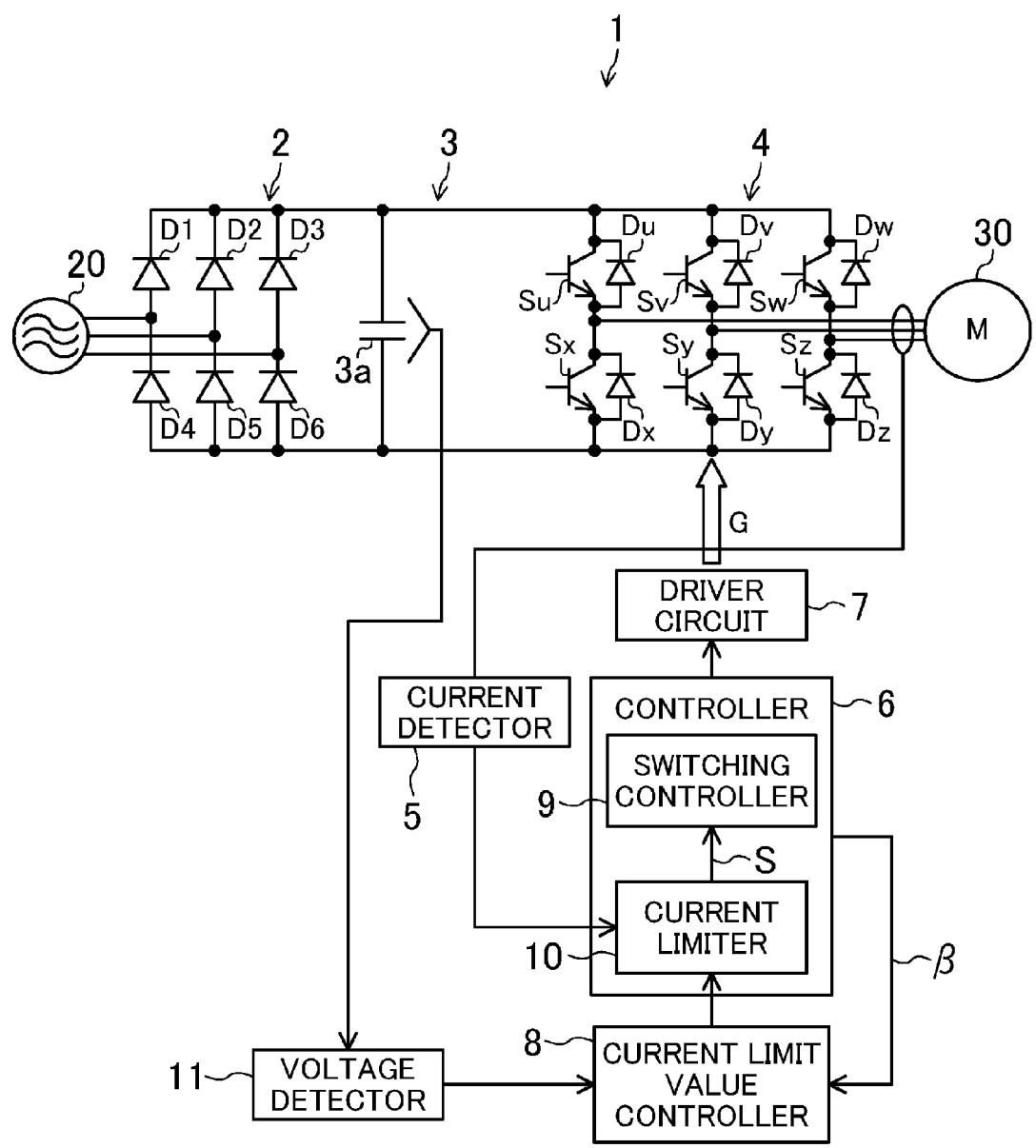
FIG. 11 illustrates an example configuration of a power converter according to the fourth embodiment of the present invention.

FIG. 11 illustrates an example configuration of a power converter (1) according to the fourth embodiment of the present invention. The power converter (1) of the present embodiment includes a voltage detector (11) in addition to the elements in the power converter (1) of the first embodiment, and the configuration of the current limit value controller (8) in the power converter (1) of the first embodiment is modified.

The switching loss is caused by variations in current and voltage. As expressed by the formulas in the third embodiment, the larger the output current of the inverter circuit (4) is, and the larger the input current is, the more the switching loss increases. The voltage of the alternating-current power supply (20) may vary by 10% or more in a day, and the input voltage of the inverter circuit (4) may also vary. Thus, the loss may vary accordingly. The current limit value controller (8) of the present embodiment therefore changes the current limit value (Imax) in accordance with variations in input voltage to the inverter circuit (4).

Figure 12:
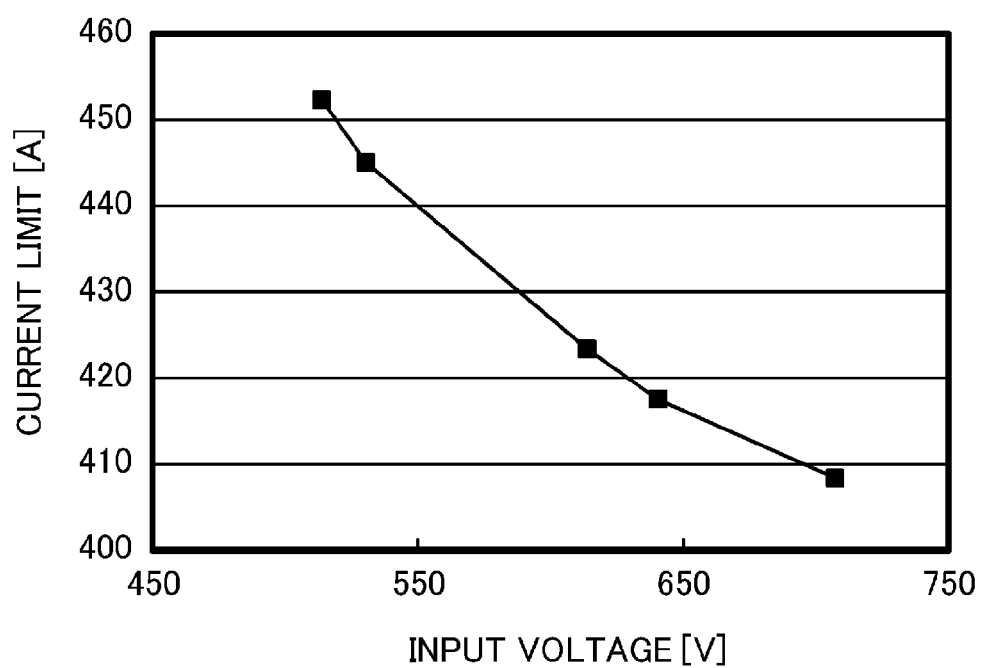
FIG. 12 shows example settings of a current limit value depending on an input voltage.

FIG. 12 shows example settings of the current limit value (Imax) in accordance with the input voltage. As mentioned earlier, the switching loss decreases as the input voltage is decreased. Therefore, the current limit value (Imax) can be increased. For example, fixing the current limit value means setting the current limit value to a current limit value required under conditions in which the loss is the greatest (in this case, to a current limit value (Imax) determined when the input voltage is largest), and this produces a loss. The current limit value controller (8) therefore sets the current limit value (Imax) such that the lower the input voltage to the inverter circuit (4) is, the greater the current limit value (Imax) becomes. That is, in the present embodiment, too, the current limit value (Imax) is decreased if the loss generated in the switching element (Su, Sv, Sw, Sx, Sy, Sz) increases at the same current value, and the current limit value (Imax) is increased if the loss decreases at the same current value.

The maximum operation area for the respective input voltages can be ensured by controlling the current limit value (Imax) as described above. Further, power can be guaranteed even if the input voltage is low, if a current can be increased when the input voltage is low. Thus, in the present embodiment, too, the operation area (i.e., the magnitude of the torque that can be output) can be increased without increasing the capacity of the switching element.

The first to third embodiments may be combined to perform the control over the current limit value (Imax) based on the input voltage.

INDUSTRIAL APPLICABILITY

The present invention is useful as a power converter having a switching element.

DESCRIPTION OF REFERENCE CHARACTERS 1 power converter
4 inverter circuit
8 current limit value controller
9 switching controller
10 current limiter

The invention claimed is:

1. A power converter, comprising:
an inverter circuit having a plurality of switching elements;
a switching controller which controls switching of the switching elements; and
a current limiter which limits a current flowing in the switching elements to prevent the current from exceeding a predetermined current limit value, wherein
the power converter includes a current limit value controller which decreases the current limit value if a loss generated in the switching elements increases at a same current value, and increases the current limit value if the loss decreases at a same current value.

2. The power converter of claim 1, wherein
the switching controller controls the switching by appropriately switching among multiple types of switching control modes in which the loss at the same current value differs from one another, and
the current limit value controller changes the current limit value according to the switching among the switching control modes.

3. The power converter of claim 2, wherein
the switching control modes include a mode performing overmodulation control, and
in the mode performing overmodulation control, the current limit value controller sets the current limit value to be greater than the current limit value in the other switching control modes.

4. The power converter of claim 2, wherein
the inverter circuit is configured to be able to output a three-phase alternating current,
the switching control modes include a three-phase modulation mode in which three phases output from the inverter circuit are modulated, and a two-phase modulation mode in which only two of the three phases output from the inverter circuit are modulated, and
in the two-phase modulation mode, the current limit value controller sets the current limit value to be greater than the current limit value in the three-phase modulation mode.

5. The power converter of claim 1, wherein
the switching controller controls the switching by appropriately changing a carrier frequency, and
the current limit value controller increases the current limit value such that the lower the carrier frequency is, the greater the current limit value becomes.

6. The power converter of claim 1, wherein
the current limit value controller sets the current limit value such that the lower an input voltage to the inverter circuit is, the greater the current limit value becomes.

7. The power converter of claim 3, wherein
the inverter circuit is configured to be able to output a three-phase alternating current,
the switching control modes include a three-phase modulation mode in which three phases output from the inverter circuit are modulated, and a two-phase modulation mode in which only two of the three phases output from the inverter circuit are modulated, and
in the two-phase modulation mode, the current limit value controller sets the current limit value to be greater than the current limit value in the three-phase modulation mode.

8. The power converter of claim 2, wherein
the switching controller controls the switching by appropriately changing a carrier frequency, and
the current limit value controller increases the current limit value such that the lower the carrier frequency is, the greater the current limit value becomes.

9. The power converter of claim 3, wherein
the switching controller controls the switching by appropriately changing a carrier frequency, and
the current limit value controller increases the current limit value such that the lower the carrier frequency is, the greater the current limit value becomes.

10. The power converter of claim 4, wherein
the switching controller controls the switching by appropriately changing a carrier frequency, and
the current limit value controller increases the current limit value such that the lower the carrier frequency is, the greater the current limit value becomes.

11. The power converter of claim 7, wherein
the switching controller controls the switching by appropriately changing a carrier frequency, and
the current limit value controller increases the current limit value such that the lower the carrier frequency is, the greater the current limit value becomes.

12. The power converter of claim 2, wherein
the current limit value controller sets the current limit value such that the lower an input voltage to the inverter circuit is, the greater the current limit value becomes.

13. The power converter of claim 3, wherein
the current limit value controller sets the current limit value such that the lower an input voltage to the inverter circuit is, the greater the current limit value becomes.

14. The power converter of claim 4, wherein
the current limit value controller sets the current limit value such that the lower an input voltage to the inverter circuit is, the greater the current limit value becomes.

15. The power converter of claim 5, wherein
the current limit value controller sets the current limit value such that the lower an input voltage to the inverter circuit is, the greater the current limit value becomes.

16. The power converter of claim 7, wherein
the current limit value controller sets the current limit value such that the lower an input voltage to the inverter circuit is, the greater the current limit value becomes.

17. The power converter of claim 8, wherein
the current limit value controller sets the current limit value such that the lower an input voltage to the inverter circuit is, the greater the current limit value becomes.

18. The power converter of claim 9, wherein
the current limit value controller sets the current limit value such that the lower an input voltage to the inverter circuit is, the greater the current limit value becomes.

19. The power converter of claim 10, wherein
the current limit value controller sets the current limit value such that the lower an input voltage to the inverter circuit is, the greater the current limit value becomes.

20. The power converter of claim 11, wherein
the current limit value controller sets the current limit value such that the lower an input voltage to the inverter circuit is, the greater the current limit value becomes.

* * * * *